US008897989B2

(12) United States Patent
Han

(10) Patent No.: US 8,897,989 B2
(45) Date of Patent: Nov. 25, 2014

(54) STARTABILITY IMPROVING METHOD FOR GDI ENGINE USING ELECTRIC CVVT CONTROL

(75) Inventor: Sung Hui Han, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 795 days.

(21) Appl. No.: 13/188,734

(22) Filed: Jul. 22, 2011

(65) Prior Publication Data

US 2012/0143463 A1 Jun. 7, 2012

(30) Foreign Application Priority Data

Dec. 6, 2010 (KR) ........................ 10-2010-0123548

(51) Int. Cl.

| | |
|---|---|
| ***G06F 19/00*** | (2011.01) |
| ***G06G 7/70*** | (2006.01) |
| ***F02M 37/04*** | (2006.01) |
| ***F01L 1/352*** | (2006.01) |
| ***F02D 41/04*** | (2006.01) |
| *F02N 19/00* | (2010.01) |
| *F01L 1/053* | (2006.01) |
| *F02D 41/00* | (2006.01) |
| *F01L 1/344* | (2006.01) |
| *F02D 41/06* | (2006.01) |
| *F02M 59/10* | (2006.01) |

(52) U.S. Cl.

CPC ........... *F01L 1/352* (2013.01); *F02N 2019/008* (2013.01); *F01L 2800/00* (2013.01); *F01L 2250/02* (2013.01); *F01L 2001/0535* (2013.01); *F01L 2001/0537* (2013.01); *F02D 2041/001* (2013.01); *F01L 2001/34469* (2013.01); *F01L 1/3442* (2013.01); *F02D 41/062* (2013.01); *F02M 59/102* (2013.01); *F02N 19/004* (2013.01); *F02D 41/042* (2013.01); *F01L 2800/03* (2013.01); *F01L 2001/34433* (2013.01); *F01L 2800/01* (2013.01); *F01L 2250/04* (2013.01); *F01L 2820/032* (2013.01)

USPC ............................ 701/102; 123/508; 701/113

(58) Field of Classification Search

CPC ................................................. F02D 2041/001

USPC .......... 123/90.15, 90.16, 90.17, 90.31, 179.1, 123/495, 500, 501, 90.32, 406.58, 406.59, 123/406.6, 406.61, 406.62, 406.63, 406.64, 123/406.65, 494; 701/102, 112; 73/114.38, 73/114.41

See application file for complete search history.

(56) References Cited

U.S. PATENT DOCUMENTS

| | | | | |
|---|---|---|---|---|
| 2004/0187816 | A1* | 9/2004 | Palesch et al. | 123/90.17 |
| 2004/0187817 | A1* | 9/2004 | Palesch et al. | 123/90.17 |
| 2010/0050965 | A1* | 3/2010 | Nakamura | 123/90.15 |
| 2010/0180863 | A1* | 7/2010 | Gwidt et al. | 123/357 |
| 2010/0241337 | A1* | 9/2010 | Watanabe | 701/105 |

FOREIGN PATENT DOCUMENTS

| | | |
|---|---|---|
| KR | 10-2002-0049261 A | 6/2002 |

* cited by examiner

*Primary Examiner* — Mahmoud Gimie
*Assistant Examiner* — Sizo Vilakazi
(74) *Attorney, Agent, or Firm* — Morgan, Lewis & Bockius LLP

(57) ABSTRACT

A method for improving startability of a of a gasoline direct injection (GDI) engine by controlling an electric continuously variable valve timing (CVVT) may include determining whether the engine is running, calculating the phase angle of the camshaft and the difference between the position of the camshaft and the optimum position of the lobe of the high pressure pump, applying a duty to the drive motor to rotate the camshaft, calculating the difference between the current position of the camshaft after rotation and the target position of the camshaft, and comparing the difference with a predetermined value. When the difference is not smaller than a predetermined value, the duty is raised and applied to the drive motor to rotate the camshaft further until the difference is reduced and smaller than the predetermined value.

6 Claims, 4 Drawing Sheets

STARTABILITY IMPROVING METHOD FOR GDI ENGINE USING ELECTRIC CVVT CONTROL

CROSS-REFERENCE TO RELATED APPLICATION

The present application claims priority of Korean Patent Application Number 10-2010-0123548 filed in the Korean Intellectual Property Office on Dec. 6, 2010, the entire contents of which application is incorporated herein for all purposes by this reference.

BACKGROUND OF INVENTION

1. Field of Invention

The present invention relates to a method for improving startability by using electric continuously variable valve timing (CVVT) control. More particularly, the present invention relates to a method that improves startability of vehicles equipped with an electric CVVT device, wherein a cam is located at a position just before a high pressure pump starts to be pressed.

2. Description of Related Art

The optimum opening/closing times of intake/exhaust valves can be generally different according to engine speed, engine load, etc. Therefore, a control technique for appropriate valve timing has been developed, wherein rotations of a camshaft are not determined according to the rotations of a crankshaft but are controlled according to a driving condition of an engine in order to get a predetermined displacement. This is called variable valve timing (VVT).

A continuously variable valve timing (CVVT) is one of variable valve timing methods, wherein valve timing can be controlled by an arbitrary value in predetermined ranges.

FIG. 1 is a cross-sectional view of a general camshaft (100) and a high pressure pump, wherein high pressure is exerted only when a lobe 30 presses a piston 12 of the high pressure pump 10.

Therefore, starting points for pressure increase are different according to positions of the camshaft 100, which leads to a starting delay. In spite of starting at the same time, pressure rising points start at different times because the camshaft 100 meets the lobe 30 of the high pressure pump 10 according to the position of the camshaft 100. As such, a pressure rising time is delayed.

A general CVVT control is fulfilled, as shown in FIG. 2 and FIG. 3, by a CVVT device mounted on the camshaft 100. In case of a dual CVVT, the control is performed by an intake CVVT 140 mounted on a cam 120 at an intake side and an exhaust CVVT 150 mounted on a cam 120 at an exhaust side.

Then, an angle calculation is performed by a rotation speed/load map input into an engine control unit (ECU) 60 when a base profile formed at the cam 120 supplies a phase difference.

If an oil control valve (OCV) 40 is supplied by an electric duty in order to rotate the camshaft 100, the OCV provides an advance chamber 142 or a retard chamber 144 in the CVVT device with high-pressure oil supplied into an oil pump attached to a driving system of an engine, and the camshaft 100 rotates in an advance or retard direction according to the amount of the supplied oil, so the cam profile of the CVVT device moves left or right.

Therefore, the CVVT device rotates much more than a predetermined cam profile in an advance or retard direction (for example, ±45 deg), so a valve overlap is generated.

A conventional mechanical CVVT drives the oil pump for the above operation and raises the hydraulic pressure of an engine and uses the hydraulic pressure, so the CVVT device cannot be moved during a low RPM condition (low hydraulic pressure condition) or starting off.

Also, in a case of a gasoline direct injection (GDI) engine, the GDI engine injects fuel at a higher pressure than in the conventional multi-position injection (MPI) engine and expedites fuel atomization, so an optimum air/fuel ratio can be obtained in spite of relatively little fuel. Further, the fuel is compressed as the drive cam 120 for high pressure pump rotates, the fuel flowed into the high pressure pump is compressed, and necessary rail pressure for injecting is obtained by repeated compression.

However, in a startability aspect, in order to form sufficient pressure at a low temperature, cranking time is long, so a much longer time compared with a conventional engine is needed.

That is, three or four lobes 30 for high pressure pumping are processed at the camshaft 100 according to the layout condition, and engine speed is generally low in a cranking interval and the high pressure pump 10 needs longer time to meet the lobe 30, so longer time is needed for the entire starting process.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method for improving startability of a gasoline direct injection (GDI) engine using electric continuously variable valve timing (CVVT) control having advantages of reducing the starting time in next starting by locating a camshaft in an engine stop state at a position just before the end of a high pressure pump lobe in order to form high pressure, and improving the startability by controlling CVVT.

Various aspects of the present invention are directed to provide a method for improving startability of a GDI engine by controlling an electric CVVT, including: determining whether the engine is running or not, calculating a phase angle of a camshaft, calculating a difference between a position of the camshaft and an optimum position of a lobe of a high pressure pump, applying a duty to a drive motor to rotate the camshaft, and calculating a difference between a current position of the camshaft after rotation and a target position of the camshaft, and comparing the difference with a predetermined value.

Some aspects of the present invention provide a method in which the position of the camshaft is calculated by a cam position sensor and a crank position sensor.

Other aspects of the present invention provide a method in which the control is finished when a difference between the current position and the target position of the camshaft is smaller than a predetermined value. When the difference is not smaller than the predetermined value, the duty is raised and applied to the drive motor to rotate the camshaft further until the difference is reduced and smaller than the predetermined value.

Yet other aspects of the present invention provide a method in which the current position of the camshaft is an advantageous position for next starting at a position of engine stop.

As described above, the exemplary embodiments of the present invention have effects that reduce the starting time in next starting by locating a camshaft at an advantageous position to form high pressure easily and starting compression of the fuel early.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
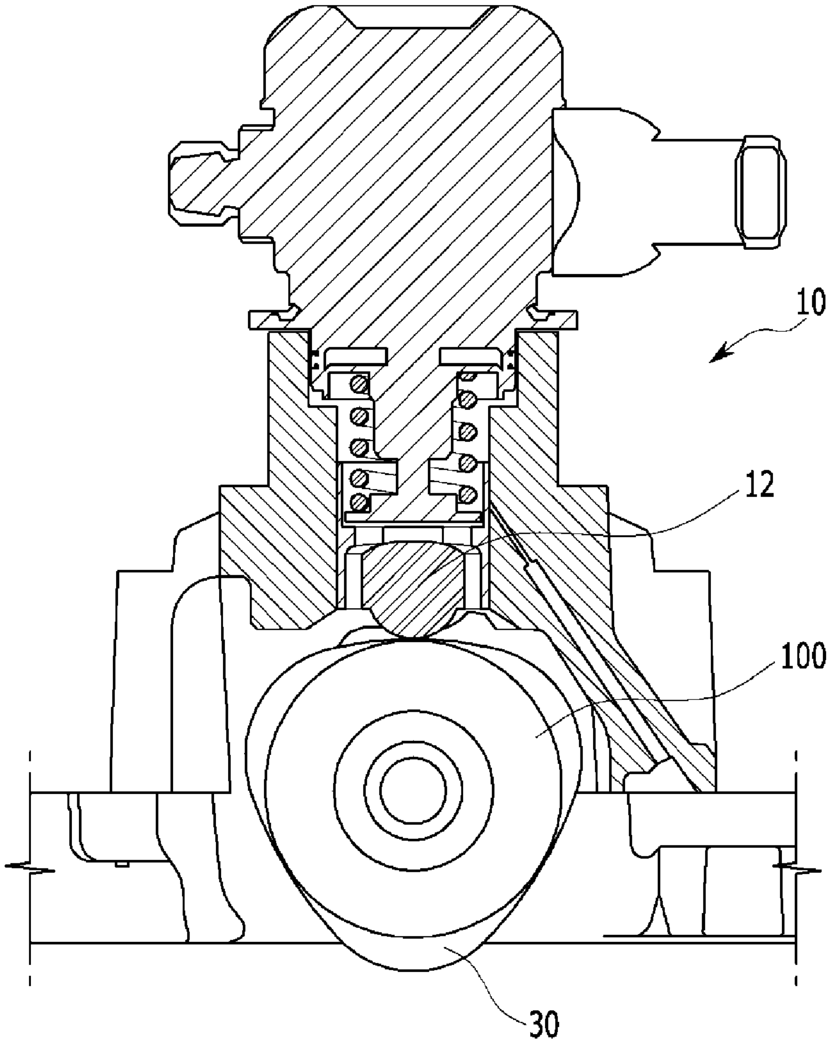
FIG.1 (Related Art)
FIG. 1 is a cross-sectional view of a general camshaft and a high pressure pump.
Figure 2:
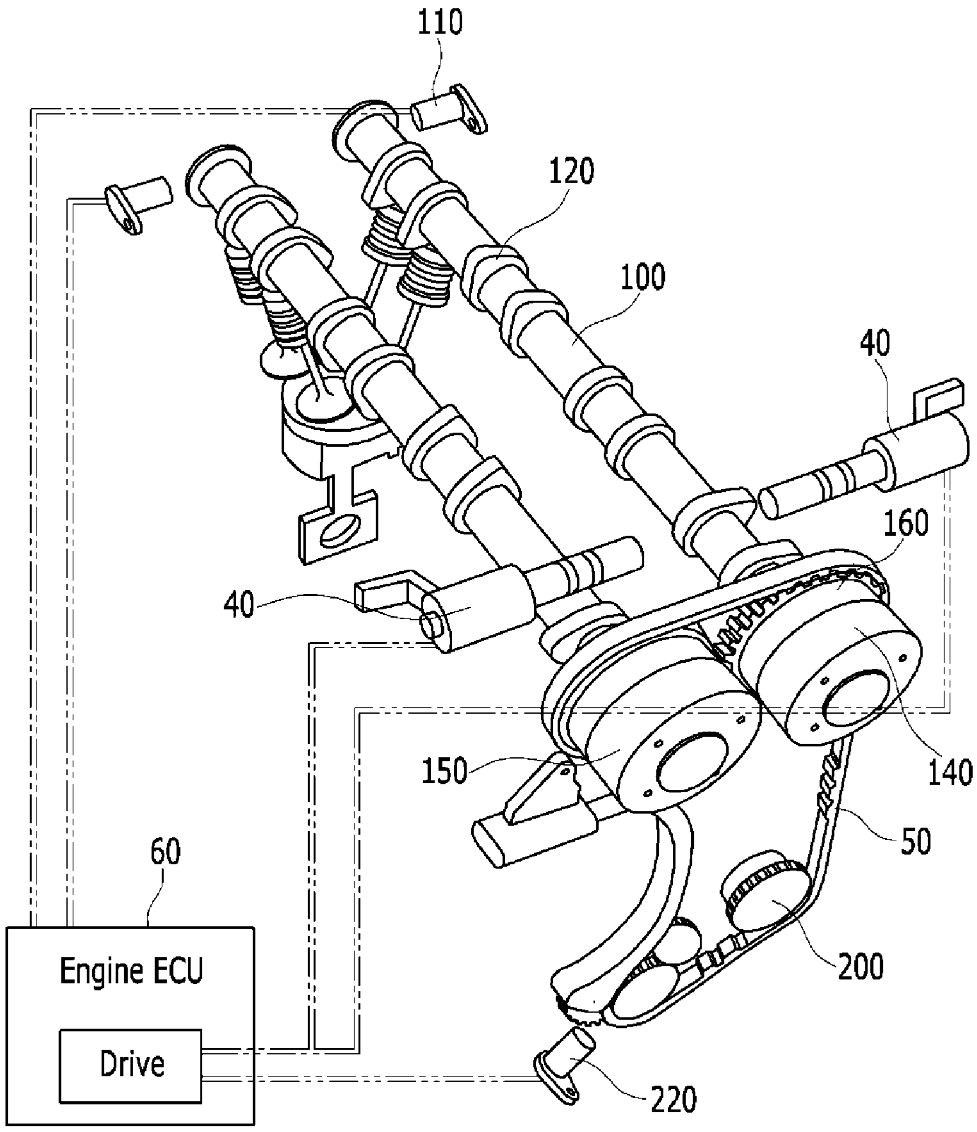
FIG. 2 shows a perspective view of a camshaft equipped with a general CVVT device.
Figure 3:
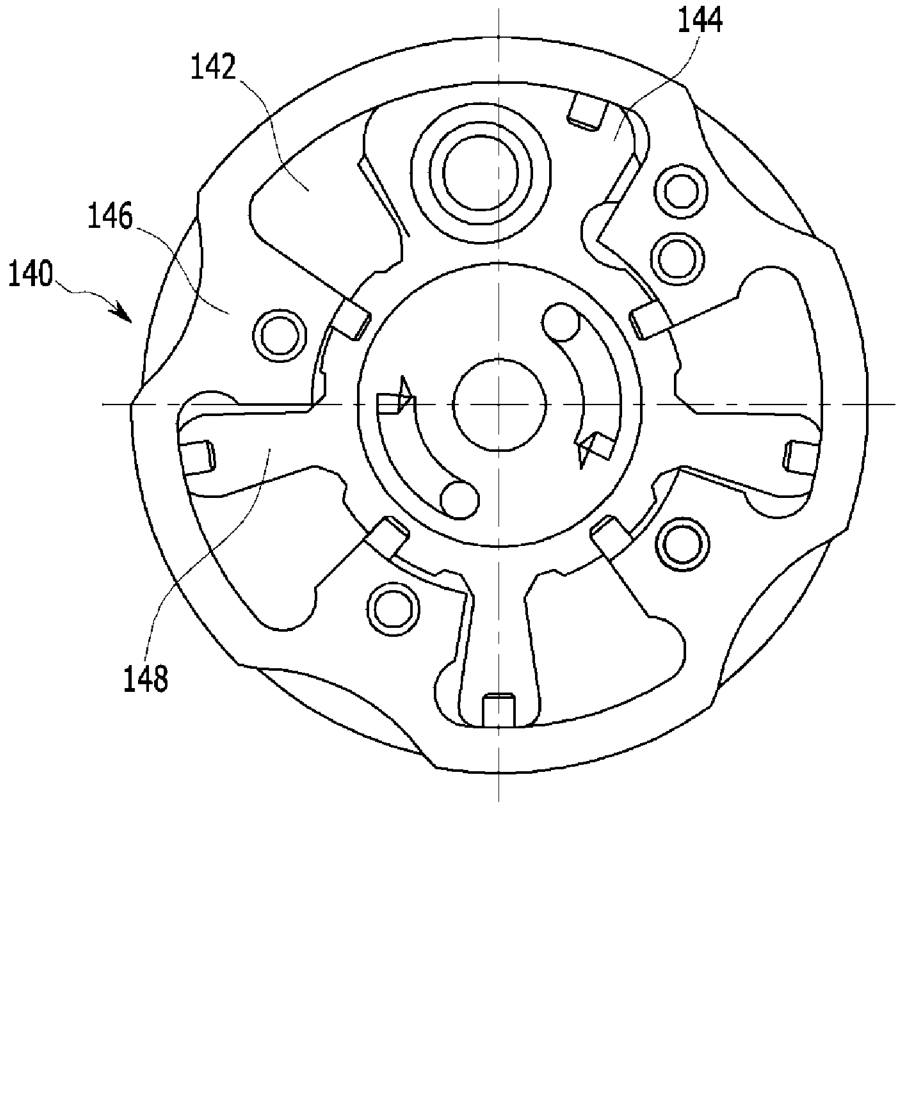
FIG. 3 is a cross-sectional view of a general CVVT device.

FIG. 2 is a perspective view of a general camshaft apparatus equipped with a CVVT device, an exemplary embodiment of the present invention related to a method for reducing starting time by locating a camshaft at an advantageous position to form high pressure easily.

In a hydraulic CVVT apparatus like in a conventional engine, hydraulic pressure is generated according to engine speed so the hydraulic pressure to drive a camshaft 100 is not generated when the engine is stopped. But in the case of an electric CVVT, when a main relay is attached, the positions of an engine and a camshaft 100 are calculated based on inputs from a cam position sensor 110 and a crank position sensor 220 for about 7 to 10 seconds even though the engine is stopped. Further, the camshaft 100 can be located at the position just before a high pressure pump 10 starts being compressed by moving the electric CVVT back and forth, which the conventional engine cannot do.

For this, the position of a camshaft 100 has to be calculated firstly, and the position can be calculated based on the inputs by the cam position sensor 110 and the crank position sensor 220. Then, the difference between a current position of the camshaft 100 and a position of the high pressure pump lobe 30 is determined by said calculation.

At this time, the lobe 30 for compressing the high pressure pump 10 is mechanically processed at a fixed position of the camshaft 100, and the information is inputted as fundamental data.

Therefore, the current position of the camshaft 100 is calculated by the cam position sensor 110 and the crank position sensor 220, and then a necessary angle to move a cam is calculated. The calculated angle indicates a predetermined angle that the cam has to be moved in an advance direction or a retard direction.

When the position of the camshaft 10 differs from the position of the high pressure pump lobe 30, the camshaft needs to be driven. In that case, the camshaft 100 is rotated by applying a duty to a drive motor.

If a correspondent positive or negative duty according to situations is applied to the electric CVVT drive motor in order to revise the calculated angle, the motor rotates the camshaft 100 in a desired direction.

If the difference between the current position of the camshaft by the rotation 100 and the target position is lower than the predetermined value, the control is finished. However, if the difference between the current position of the camshaft and the target position is higher than the predetermined value, a higher duty is applied to the motor, so the difference between the current position of the camshaft 100 and the target position is reduced.

The current position of the camshaft 100 is continuously calculated. When the current position of the camshaft 100 reaches the target position, the control is finished and power supply is interrupted. At this time, the current position of the camshaft 100 means the advantageous position for next starting after engine stop, and the advantageous position means the position just before the high pressure pump 10 starts compressing at the next start.

Figure 4:
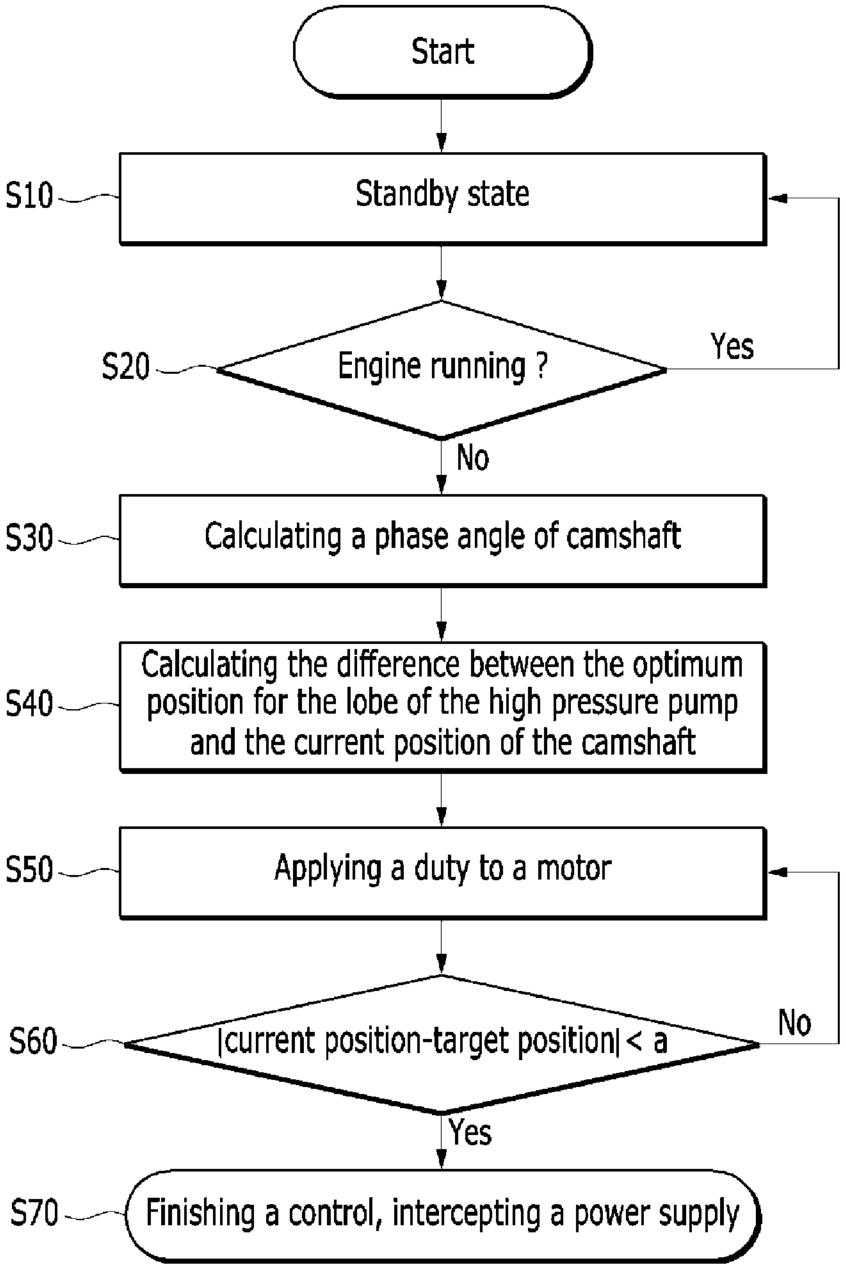
FIG. 4 is a flowchart for improving startability according to exemplary embodiments of the present invention.

Hereinafter, exemplary embodiments of the present invention will be described according to a control process referring to FIG. 4.

First, it determines whether the engine operates or not (S20). If the engine does not operate, the phase angle of the camshaft 100 is calculated by the cam position sensor 110 and the crank position sensor 220 (S30), and the difference between the optimum position for the lobe 30 of the high pressure pump 10 and the current position of the camshaft 100 is calculated (S40).

As a result, a duty is applied to a motor according to the difference between the current position and the target position for the lobe 30 of the high pressure pump (S50). The difference between the current position and the target position for the lobe 30 of the high pressure pump 10 is compared with a predetermined value a (S60), and then if the difference is larger than the predetermined value, the applied duty is raised. And if the difference is smaller than the predetermined value, the control is finished and the power supply is interrupted (S70)

The current position of the camshaft 100 is changed to the target position at the highest applied duty by controlling the difference between the current position and the target position of the camshaft 100 through the predetermined value a.

That is, if the current position of the camshaft 100 is located at the front and the rear position of the target position and criterion (S60) is met, the control is finished. If the current position of the camshaft 100 is away from the front and the rear position of the target position and criterion (S60) has not been achieved, the motor duty is raised and the camshaft is rotated until criterion (S60) is met and thus the control is finished.

Other reference numbers 50, 146, 148, 160, 200 in the drawings respectively indicate a chain, a housing vane, a rotor vane, a cam sprocket, a crank sprocket.

For convenience in explanation and accurate definition in the appended claims, the terms "lower", "higher", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for improving startability of a gasoline direct injection (GDI) engine using electric continuously variable valve timing (CVVT), the method comprising:

determining whether the engine is running or not;

calculating a phase angle of a camshaft;

calculating a difference between a position of the camshaft and an optimum position of a lobe of a high pressure pump;

applying a duty to a drive motor to rotate the camshaft; and calculating a difference between a current position of the camshaft after rotation and a target position of the camshaft, and comparing said difference with a predetermined value.

2. The method of claim 1, wherein the position of the camshaft is calculated based on inputs from a cam position sensor and a crank position sensor.

3. The method of claim 1, wherein a control of the method is finished when said difference between the current position of the camshaft after rotation and the target position of the camshaft is smaller than a predetermined value, whereas the duty is raised and applied to the drive motor to rotate the camshaft further when said difference is not smaller than the predetermined value.

4. The method of claim 3, wherein the duty is raised according to said difference between the current position of the camshaft after rotation and the target position of the camshaft.

5. The method of claim 3, wherein the current position of the camshaft is an advantageous position for a next starting after an engine stop.

6. The method of claim 5, wherein the advantageous position for the next starting is a position just before the high pressure pump starts to be pressed during the next starting.

* * * * *